United States Patent
Feuilloley

(10) Patent No.: US 9,296,148 B2
(45) Date of Patent: Mar. 29, 2016

(54) METHOD OF HEATING PREFORMS FOR THE MANUFACTURE OF CONTAINERS

(75) Inventor: Guy Feuilloley, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 441 days.

(21) Appl. No.: 12/596,803

(22) PCT Filed: Apr. 22, 2008

(86) PCT No.: PCT/IB2008/001251
§ 371 (c)(1),
(2), (4) Date: Jan. 12, 2010

(87) PCT Pub. No.: WO2008/132603
PCT Pub. Date: Nov. 6, 2008

(65) Prior Publication Data
US 2010/0127435 A1  May 27, 2010

(30) Foreign Application Priority Data

Apr. 25, 2007 (FR) ...................................... 07 03003

(51) Int. Cl.
| | |
|---|---|
| B29C 67/00 | (2006.01) |
| B29C 49/64 | (2006.01) |
| B29C 49/78 | (2006.01) |
| B29B 11/14 | (2006.01) |
| B29C 49/06 | (2006.01) |
| B29C 49/68 | (2006.01) |
| B29C 35/08 | (2006.01) |
| B29K 67/00 | (2006.01) |
| B29L 31/00 | (2006.01) |

(52) U.S. Cl.
CPC ............. *B29C 49/6436* (2013.01); *B29C 49/78* (2013.01); *B29B 11/14* (2013.01); *B29B 2911/1444* (2013.01); *B29B 2911/14326* (2013.01); *B29B 2911/14333* (2013.01); *B29B 2911/14466* (2013.01); *B29C 49/06* (2013.01); *B29C 49/68* (2013.01); *B29C 2035/0822* (2013.01); *B29K 2067/00* (2013.01); *B29L 2031/7158* (2013.01)

(58) Field of Classification Search
USPC ......... 264/492, 410, 458, 462, 476, 481, 493, 264/494, 495, 496, 506, 171.12, 171.13, 264/171.22, 903
See application file for complete search history.

(56) References Cited

U.S. PATENT DOCUMENTS

| | | | |
|---|---|---|---|
| 5,681,521 A | | 10/1997 | Emmer et al. |
| 5,920,677 A | * | 7/1999 | Emmer et al. ................ 392/419 |
| 2008/0099961 A1 | * | 5/2008 | Feuilloley et al. ............ 264/405 |

FOREIGN PATENT DOCUMENTS

| | | |
|---|---|---|
| FR | 2703944 A1 | 10/1994 |
| WO | 02/087850 A1 | 11/2002 |
| WO | 2005/000560 A2 | 1/2005 |
| WO | 2006/056673 A1 | 6/2006 |
| WO | 2006/069261 A2 | 6/2006 |
| WO | WO 2006056673 * | 6/2006 |

\* cited by examiner

*Primary Examiner* — Stella Yi
(74) *Attorney, Agent, or Firm* — Sughrue Mion, PLLC

(57) ABSTRACT

Method of heating a plastic preform (1) for the manufacture of a container by forming it from the preform (1), this method comprising:
- a step of transporting the preform (1) along a predetermined path with rotation of the preform (1) about its axis (A); and
- a step of heating the preform (1) along said path by means of infrared radiation sources (11), wherein the intensity of the emitted radiation is regulated along the path so as to heat selectively at least one angular section (7, 7a, 7b) of the preform (1).

12 Claims, 2 Drawing Sheets

METHOD OF HEATING PREFORMS FOR THE MANUFACTURE OF CONTAINERS

The invention relates to the heating of plastic performs, especially those made of polyethylene terephthalate (PET), for the manufacture of containers such as bottles and flasks therefrom.

The most widely used heating technique consists in mounting the performs on rotary supports, commonly called "spinners", which follow a path along which a running furnace equipped with infrared radiation lamps is placed. The rotation of the preforms about their main axis as they run past the oven gives the heating a certain uniformity.

The infrared radiation lamps generally line a side wall of the oven, facing which there lies a reflecting wall whereby that fraction of the radiation not absorbed by the preforms is reflected onto them.

This, now conventional, technique has already been the subject of improvements for allowing the production of containers with a particular shape, especially when these do not have symmetry of revolution (containers of polygonal or flattened cross section).

In this case, an adapted heating technique consists in heating the preforms non-uniformly around their circumference, so as to have at least one comparatively hotter angular sector than one or more adjacent angular sectors.

The problem associated with this non-uniform heating is well explained in the French Patent FR 2 703 944 (and in its United States equivalent U.S. Pat. No. 5,681,521) in the name of the Applicant, which proposes a cunning solution consisting in creating discontinuities in the reflecting wall (either by adding masks in front of it or by producing recesses) that absorb the radiation rather than reflecting it.

This solution is satisfactory and is also widely exploited. However, it does suffer from a few drawbacks, which make it able to be improved. Firstly, the energy consumed by the oven is not less than in the ordinary configuration. Indeed on the contrary, for some applications the temperature of the masks placed in front of the reflecting wall is regulated by means of a cooling system, which increases the total energy consumed. Secondly, the heating lacks precision, the transition between the hot sectors of the preform and the comparatively cooler sectors lacking sharpness.

There is also a need for a heating technique having better selectivity and possibly allowing the energy consumed to be reduced.

For this purpose, the invention provides, according to a first aspect, a method of heating a plastic preform for the manufacture of a container by forming it from the preform, this method comprising:
- a step of transporting the preform along a predetermined path with rotation of the preform about its axis; and
- a step of heating the preform along said path by means of infrared radiation sources, the intensity of the emitted radiation being regulated along the path so as to heat selectively at least one angular section of the preform.

Other objects and advantages of the invention will become apparent in the light of the description given below with reference to the appended drawings in which.

Figure 1:
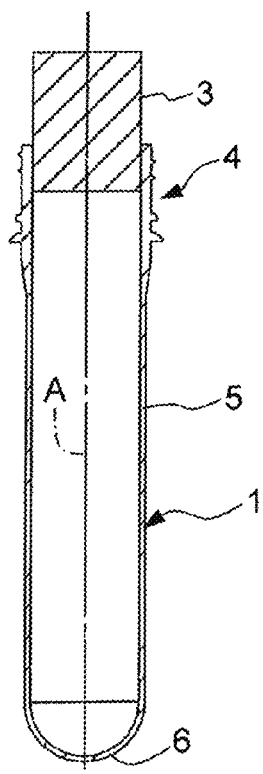
FIG. 1 is a cross-sectional side view showing a preform mounted on a rotary support.

FIG. 1 shows in cross section a preform 1 which, in order to be heated on the run within an oven 2, is mounted on a rotary gripping device 3 (called a spinner) fastened to a chain driven so as to move at a constant linear speed.

The preform 1, made of a thermoplastic such as polyethylene terephthalate (PET), is intended, after having been softened by heating at a temperature above its glass transition temperature, to undergo a blow moulding or stretch-blow moulding operation in a mould in order to form a container, such as a bottle or a flask.

The preform 1 has at its upper end a neck 4, which is intended to undergo minimal deformation both during the heating and the subsequent moulding. Fitted into the neck 4 is the lower end of the spinner 3, in the form of a finger.

By means of the upper end in the form of a pinion (not shown), the spinner 3 engages with a rack placed along the path of the preform 1. In this way, said preform is rotated about its axis of revolution A (called the principal axis) with a rotation speed directly proportional to its speed of linear displacement.

The preform 1 has an approximately tubular body 5 which terminates, on the opposite side to the neck 4, in a bottom 6 in the form of a hemispherical cap.

Figure 2:
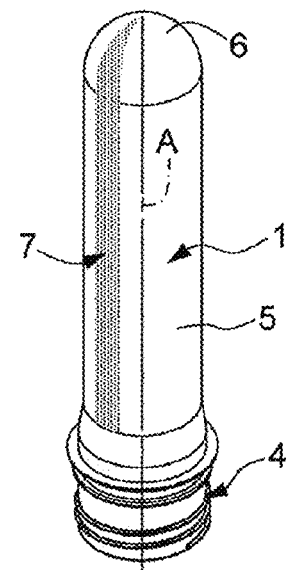
FIG. 2 is a perspective view showing a preform that has undergone selected heating, a comparatively hotter section being shaded grey.
Figure 3:
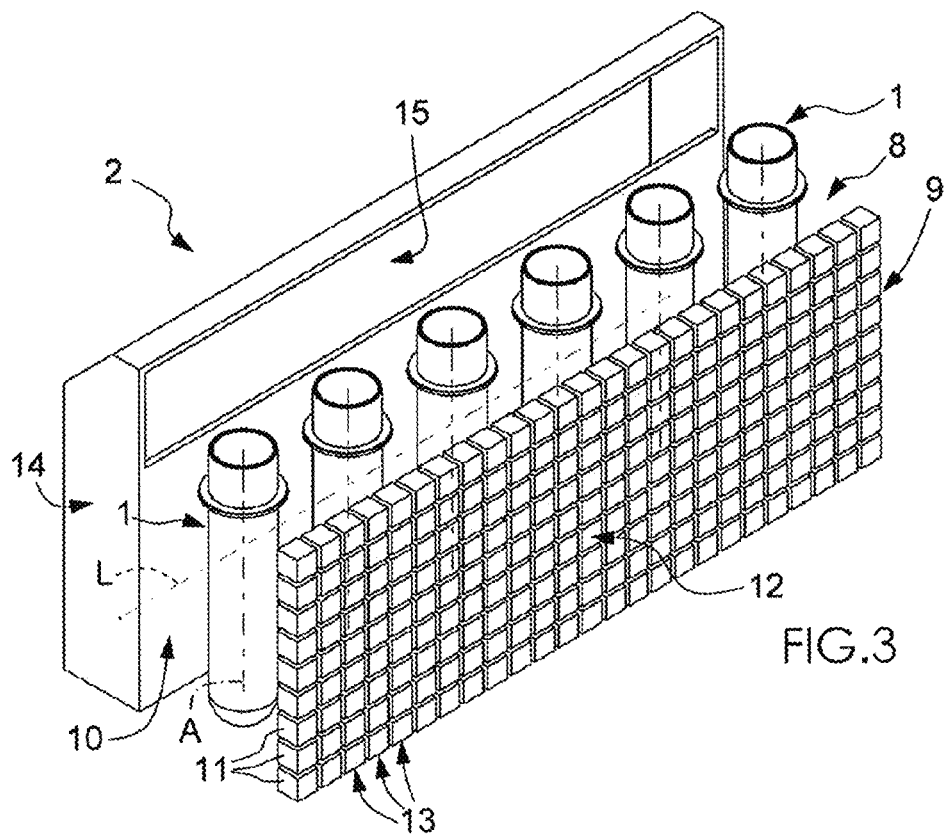
FIG. 3 is a perspective view showing a heater within which the preforms are run.

In FIG. 1, the preform 1 is shown with the neck 4 uppermost—it is in this position that it is introduced into the oven 2 and runs past it. In FIG. 2, the preform 1 is shown with the neck at the bottom, in order to show on it an angular sector 7 (shaded grey) subjected in the oven 2 to selective heating. This sector 7 along a principal axis A along the body 5 and on the bottom 6 of the preform 1 as far as the lower end of the latter. In practice, depending on the applied heating profile, the profile 1 may comprise several sectors 7 subjected to selective heating, for example two diametrically opposed sectors, as will be seen later.

The description now refers to FIGS. 3 to 6.

The preforms 1 within the oven 2 follow an approximately rectilinear longitudinal path L (although this may have any type of profile) that extends from the inlet of the oven 2 as far as its outlet. After the preforms 1 have followed the path L, they will have been subjected to heating according to a predetermined profile for carrying out the desired blow moulding.

The oven 2 comprises an enclosure 8 bounded by two facing vertical walls 9, 10 which extend approximately parallel to the path travelled, these being placed on either side of the latter.

The walls 9, 10 extend over a height approximately equal to the length of the body 5 of the preform 1. In the configuration illustrated, the preform is orientated with a neck 4 uppermost, the latter extending beyond the enclosure 8 above the walls 9, 10. This configuration is not absolutely necessary—as a variant, the preform 1 be oriented with the neck 4 downmost.

A first wall 9, called the emitting wall, is lined with a plurality of infrared radiation sources 11 directed towards the inside of the enclosure 8. In practice, each of these sources 11 takes the form of a laser diode. The diodes are organized so as to form a matrix 12, for example by juxtaposition (and possibly superposition) of blocks of diodes 11, as described in international application WO 2006/056673 in the name of the Applicant.

Each diode 11 emits a beam oriented transversely to the path travelled and lying in a horizontal plane, in such a way that each diode 11 contributes to heating an annular portion of each preform 1, which runs, at its height, through the oven 2. The angular orientation of the diodes 11 is left up to the person skilled in the art. In particular, the diodes 11 may be pivoted about a vertical axis.

In practice, the matrix 12 may be produced by the juxtaposition of blocks 13 of laser diodes 11 of the type sold by Nuvonyx, each diode 11 emitting a flat laser beam with a maximum individual power of 40 W at a wavelength of 940 nm.

Figure 5:
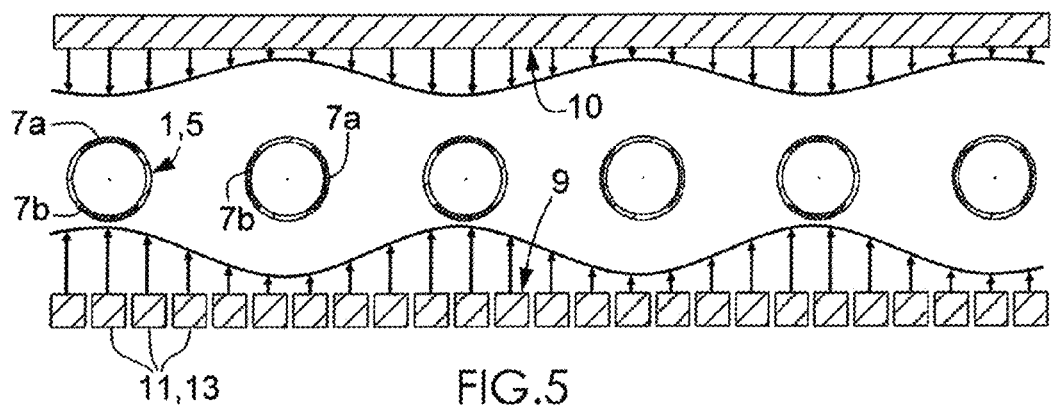
FIG. 5 is a cross-sectional view, in the plane of section V-V, of the device of FIG. 4, in which a heating profile of sinusoidal type has been shown.
Figure 6:
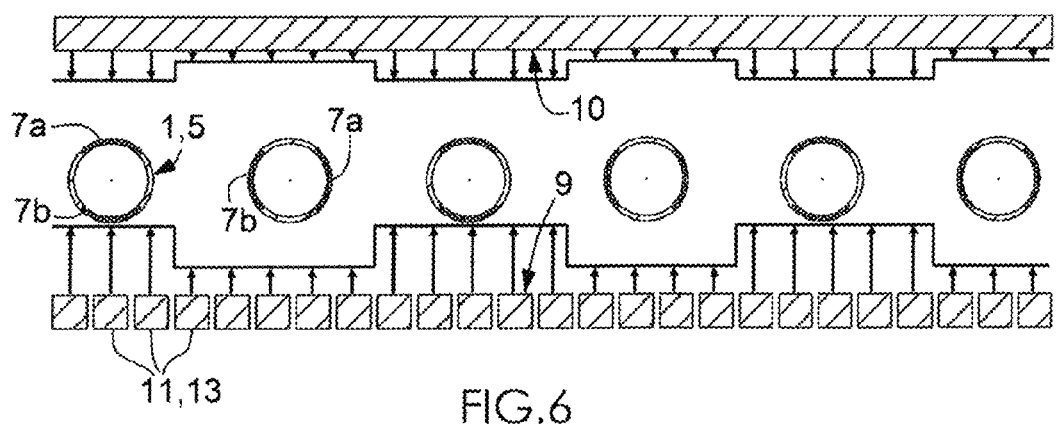
FIG. 6 is a view similar to FIG. 5, which illustrates a variant in which the heating profile is of the crenellated type.

According to the embodiment illustrated in FIGS. 5 and 6, the facing wall 10, called the reflector, has a continuous reflecting internal face so that the portion of the radiation emitted by the emitting wall 9, which is not absorbed by the preforms 1, is reflected thereat onto them.

Figure 4:
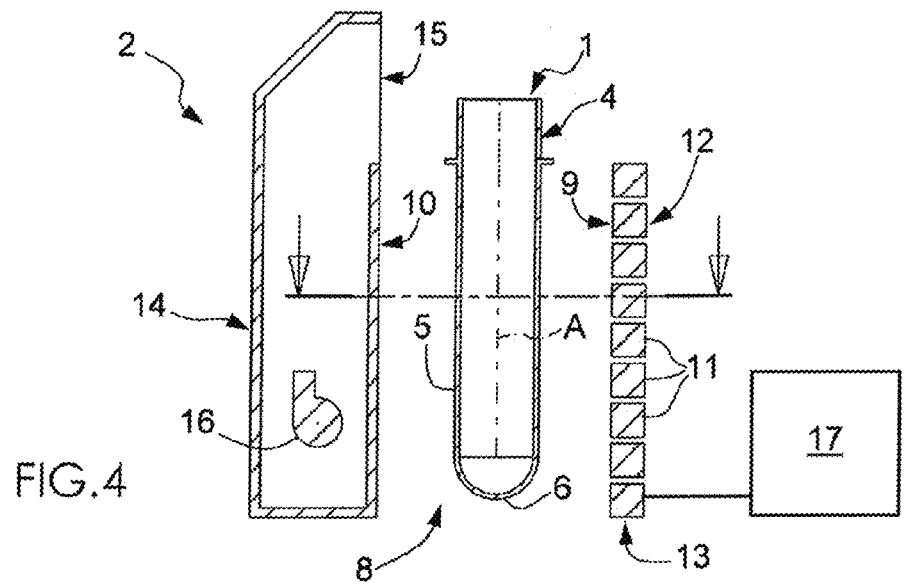
FIG. 4 is a cross-sectional side view of the device of FIG. 3.

As illustrated in FIG. 4, the oven 2 may include a ventilation box 14, placed behind the reflector 10, this box 14 having an opening 15 that opens along the path above the enclosure 8. In this box 14 is a fan 16 that generates a flow of air expelled transversely through the opening 15 so as to cool the neck 4.

Moreover, the oven 2 is equipped with a system 17 for regulating the power of the diodes 11 in vertical slices, so as to regulate the intensity of the radiation emitted along the path. This regulation in vertical slices may optionally be combined with regulation in horizontal slices, the intensity of the emitted radiation being regulated parallel to the axis A of the preforms 1. This regulation is carried out by means of an alternation zones I1 for emitting more intense radiation and zones I2 for emitting comparatively less intense radiation, the alternation (i.e. the distance between two more intense radiation zones I1) being equal to or less than the distance travelled by the preform 1 during one complete rotation about its axis A.

In this way, the sector or sectors 7 of the preform 1 passing in succession past the zones I1 are subjected to more intense radiation than the sectors passing in front of the zones I2. The sectors 7 are therefore heated selectively, that is to say at a higher temperature.

It should be noted that although, from the standpoint of the preform 1, the radiation to which it is subjected varies in intensity as it moves through the oven 2, from the standpoint of the oven 2 the intensity of the radiation is substantially invariant over time, each source 11 emitting radiation of constant intensity.

The heating profile, that is to say the profile of the intensity of the radiation along the path, is defined according to the final shape that it is desired to give the container and according to the distribution profile of the material in said container.

Two examples are illustrated in FIGS. 5 and 6 which make it possible to heat the preforms 1 selectively so as to heat, to a comparatively hotter temperature, two diametrically opposed sectors, 7a, 7b, which lie along the principal axis A of the preform on the body 5 and the bottom 6 where a predefined angular spread.

For this purpose, according to a personal embodiment illustrated in FIG. 5, the heating profile is of sinusoidal shape along the path. Shown in FIG. 5 in the form of arrows is the intensity of each diode 11 belonging to one and the same vertical block 13. Shown by the sinusoidal continuous line is the envelope of the intensity of the radiation, joining (with smoothing) the ends of the arrows. Shown similarly is the intensity of the radiation reflected by the reflector 10, noting that the intensity of the reflected radiation is comparatively lower than the intensity of the emitted radiation, owing to the absorption by the preforms 1 of part of this radiation.

It will readily be understood, that, in order for the same portions of the preforms 1 to be heated selectively along the path, the intensity of the emitted radiation has a periodic character (that is to say that the alternation defined above is approximately constant), although the value of the intensity at the intensity peaks can vary along the path (in FIG. 5, the intensity at the peaks is shown constant). The period is a function of the distance travelled by the preform 1 or a rotation about its axis A through a predetermined angle. This angle is chosen according to the angular position of the sector 7 that it is desired to subject to selected heating. It will be recalled that each point located on the circumference of the preform 1 describes a cycloid, the period of which is equal to the distance travelled by the preform 1 for one complete revolution about its axis A.

In order to selectively heat two diametrically opposed sectors 7a, 7b, the period of the intensity of the radiation is set to one half of the period of the cycloid. In this way, the comparatively hotter sectors 7a, 7b are exposed to the intensity peaks at each rotation of the preform 1 to 180° about its axis A. As regards the intermediate sectors, which are comparatively cooler, these are exposed to the intensity troughs at each rotation of the preform 1 through 180° about its axis A, but with a phase shift of one quarter of a revolution relative to the comparatively hotter sectors 7a, 7b.

According to a second embodiment, illustrated in FIG. 6, the heating profile is also periodic along the path, but it has a crenellated profile. To obtain such a heating profile, there is an alternation on the emitting wall 9 of trains of diodes 11 emitting relatively intense radiation and trains of diodes 11 emitting comparatively less intense radiation. The period of the signal is chosen in the same way as previously. The effect obtained is similar, although in this case the transition between the comparatively hotter zones and the comparatively cooler zones is more abrupt.

The preforms 1 thus heated are then transferred to a moulding unit so as to be formed therein. The comparatively hotter sections 7a, 7b have greater deformability than their comparatively cooler zones. This differential distribution of the temperature in the preform 1 makes it possible to obtain a container of complex shape, for example a container having a flattened (for example oval or rectangular) cross section, the comparatively hotter sectors 7a, 7b of which will form the large faces, whereas the comparatively cooler sectors will form the small faces, without an appreciable variation in the thickness of the container.

By varying the intensity of the emitted radiation, some of the energy usually radiated has a pure loss is saved. Thanks to this regulation, it also possible to delimit the comparatively hotter sectors 7a, 7b more precisely, to the benefit of the precision of the subsequent manufacture of the container.

The embodiments described above are not limiting as regards the heating profiles that can be envisaged.

Thus, it is possible to adapt the radiation profile, for example by regulating the respective values of the intensity peaks and troughs, as well as their intermediate values. A continuously variable profile may be chosen, that is to say one with soft transitions between the peaks and troughs, as in the sinusoidal case described above, or on the contrary a broken profile, for example a crenellated (see above) or triangular profile.

It is also possible to choose to have radiation emitted with a period adapted to the desired heating profile.

Thus, it is possible for only a single angular portion of the preform 1 to be selectively heated. For this purpose, the period will be set to the period of the cycloid described by this portion, which portion will be periodically exposed to an intensity peak of the radiation for each complete revolution (360°) of the preform 1 about its principal axis A.

Similarly, to obtain three comparatively hotter portions distributed at 120°, the period of the intensity of the radiation will be set to one third of the period of the cycloid.

In both cases, it may prove necessary to modify the structure of the oven 2 so as to limit or even eliminate the reflected part of the radiation that contributes to approximately symmetrical heating of the preform 1.

Likewise, the intensity of the peaks (or hollows) may be varied along the path, for example so that the intensity of the radiation emitted in the peaks increases (or on the contrary decreases).

Several solutions can be envisaged: the wall 10 may be coated with an absorbent coating (such as a paint); it may be sufficiently far from the preforms 1 so that the reflected radiation is largely dissipated; or else it is even possible for the wall 10 to be completely eliminated. However, the latter solution is not the preference of the inventors, because of the potential danger that unconfined infrared radiation may represent.

The invention claimed is:

1. A method of heating a plastic preform for the manufacture of a container by forming it from the preform, the preform comprising a body and a bottom, comprising:
   a step of transporting the preform along a predetermined path with rotation of the preform about its axis; and
   a step of heating the preform along said path by means of infrared radiation sources disposed along said path,
   wherein the step of heating includes regulating power to the radiation sources so as to regulate the intensity of emitted radiation of the radiation sources to have a periodic character along the path, so as to heat selectively at least one angular section of the preform, along a principal axis of the preform, along the body and on the bottom of the preform, wherein the radiation sources are regulated to alternatingly emit zones of more intense radiation and emit zones of radiation of comparatively less intensity along said path.

2. The method of heating according to claim 1, wherein the alternation is equal to or less than the distance travelled by the preform, during one complete rotation about its axis.

3. The method of heating according claim 1, wherein the intensity of the radiation is periodic along the path.

4. The method of heating according to claim 3, wherein the period of the intensity of the radiation is equal or approximately equal to the distance travelled by the preform for a rotation of a half-revolution about its axis.

5. The method of heating according to claim 3, wherein the period of the intensity of the radiation is equal or approximately equal to the distance travelled by the preform for a rotation of one revolution about its axis.

6. The method of heating according to claim 1, wherein the intensity of the radiation has a continuously variable profile along the path.

7. The method of heating according to claim 1, wherein the intensity of the radiation has an approximately sinusoidal profile along the path.

8. The method of heating according to claim 1, wherein the intensity of the radiation has an approximately crenellated profile along the path.

9. The method of heating according to claim 1, wherein the infrared radiation sources are laser diodes, and the step of regulating the intensity of the emitted radiation is performed by regulating a power of the laser diodes.

10. The method of heating according to claim 1, wherein the at least one angular section of the preform is elongated in a vertical direction parallel to the preform axis of revolution and perpendicular to a direction of movement of the preform along the path.

11. The method of heating according to claim 10, wherein the at least one angular section extends from the bottom of the preform to, but not including, a neck of the preform.

12. A method of heating a plastic preform for the manufacture of a container by forming it from the preform, comprising:
   transporting the preform along a predetermined path while rotating the preform about a longitudinal axis thereof; and
   heating the preform during the transporting and the rotating of the preform, continuously along the predetermined path,
   wherein the heating includes regulating power to a matrix of diodes disposed on an emitting wall that is disposed along one side of the predetermined path, so as to regulate an intensity of radiation being emitted directly from the diodes to the preform continuously along the predetermined path, the intensity of the radiation being emitted directly from the diodes with alternating intensity in adjacent zones along the predetermined path, so that the adjacent zones disposed along the predetermined path include the alternating intensity of relatively higher and lower intense radiation with respect to each other, the alternation of the intensity having a periodic character, so as to selectively heat an angular section of the preform that includes a body and a bottom of the preform, at a constant intensity of radiation along a longitudinal axis of the preform, with more or less intense radiation than an adjacent angular section of the preform.

* * * * *